US006914724B2

(12) United States Patent
Redmond

(10) Patent No.: US 6,914,724 B2
(45) Date of Patent: Jul. 5, 2005

(54) MICRO LENS AND METHOD AND APPARATUS FOR FABRICATING

(75) Inventor: Ian R. Redmond, Boulder, CO (US)

(73) Assignee: DPHI Acquisitions, Inc., Boulder, CO (US)

(*) Notice: Subject to any disclaimer, the term of this patent is extended or adjusted under 35 U.S.C. 154(b) by 253 days.

(21) Appl. No.: 10/278,719

(22) Filed: Oct. 22, 2002

(65) Prior Publication Data

US 2003/0107815 A1 Jun. 12, 2003

Related U.S. Application Data

(63) Continuation of application No. 09/666,616, filed on Sep. 20, 2000, now abandoned.

(51) Int. Cl.⁷ .......................... G02B 27/10; B29D 11/00
(52) U.S. Cl. .......................... 359/619; 359/642; 216/24
(58) Field of Search ................... 359/642, 619, 359/718, 719, 819; 438/113, 27, 68, 69; 257/98; 216/24

(56) References Cited

U.S. PATENT DOCUMENTS

| | | | |
|---|---|---|---|
| 5,217,916 A | 6/1993 | Anderson et al. | 437/51 |
| 5,370,768 A | 12/1994 | Mersereau et al. | 156/643 |
| 5,805,355 A | 9/1998 | Natsuno | 359/719 |
| 6,219,191 B1 | 4/2001 | Iwaki et al. | 359/811 |
| 6,235,141 B1 | 5/2001 | Feldman et al. | 156/250 |

FOREIGN PATENT DOCUMENTS

| | | |
|---|---|---|
| EP | 0706070 A | 4/1996 |
| JP | 2000231007 | 8/2000 |
| JP | 2001290008 | 10/2001 |

OTHER PUBLICATIONS

Osamu Wada et al., "High–Performance, High–Reliability InP/GaInAs p–i–n Photodiodes And Flip–Chip Integrated Receivers For Lightwave Communications" 8217 Journal of Lightwave Technology vol. 9, Sep. 1991, New York, US, pp. 1200–1207.

Masao Makiuchi et al., "Flip–Chip Planar GaInAs/InP p–i–n Photodiodes Fabrication and Characteristics" Journal of Lightwave Technology, vol. 13, No. 11, Nov. 1995, pp. 2270–2275.

Primary Examiner—Georgia Epps
Assistant Examiner—M. Hasan
(74) Attorney, Agent, or Firm—Jonathan Hallman; MacPherson Kwok Chen & Heid

(57) ABSTRACT

Micro lenses are fabricated using processes which operate on multiple lenses at a time. In one embodiment, wafer-scale processing includes employing photolithography for defining gray-scale masks which permit relatively smooth or continuous curvatures of lens surfaces to be formed by, e.g., reactive ion etching. Processes and materials are used which achieve desired etching at a sufficiently rapid rate such as etching to a depth of about 200 micrometers in less than about 10 hours. Wafer-scale molding processes can also be used. Diffractive features can be formed on or adjacent lens surfaces to provide functions such as dispersion correction. Also, sub-wavelength scale features may be etched to provide quarter-wave plate functionality, birefringence, anti-reflective functions and the like. Structures such as mounting rings and/or crash stops can be formed integrally with the lens body, eliminating the need to glue or otherwise couple separate components.

13 Claims, 3 Drawing Sheets

MICRO LENS AND METHOD AND APPARATUS FOR FABRICATING

CROSS REFERENCE TO RELATED APPLICATION

This application is a continuation of U.S. patent application Ser. No. 09/666,616, filed Sep. 20, 2000, now abandoned entitled "Micro Lens And Method And Apparatus For Fabricating".

Cross reference is made to pending U.S. patent application Ser. No. 09/540,657 filed Mar. 31, 2000 entitled: Low Profile Optical Head; U.S. patent application Ser. No. 09/652,975, filed Aug. 31, 2000 entitled: Double-Sided Digital Optical Disk and Method; U.S. patent application Ser. No. 09/315,398 entitled Removable Optical Storage Device and System, filed May 20, 1999; U.S. patent application Ser. No. 60/140,633 entitled Combination Mastered and Writeable Medium and Use in Electronic Book Internet Appliance, filed Jun. 23, 1999; U.S. patent application Ser. No. 09/393,899, filed Sep. 10, 1999, entitled Content Distribution Method and Apparatus; U.S. patent application Ser. No. 09/393,150, filed Sep. 10, 1999, entitled Writeable Mediuni Access Control Using a Medium Writeable Area; U.S. patent application Ser. No. 09/457,104 filed Dec. 7, 1999 entitled Low Profile Optical Head; U.S. patent application Ser. No. 09/560,781 filed Apr. 28, 2000 entitled Miniature Optical Disk for Data Storage; and U.S. patent application Ser. No. 09/557,284 flied Apr. 24, 2000 entitled Tilt Focus Method and Mechanism for an Optical Drive, all of which are incorporated herein by reference.

The present invention relates to a lens and its method and apparatus of fabrication, and in particular to a small, "micro", lens formed using one or more etching and/or coating operations, preferably using wafer-scale technology.

BACKGROUND INFORMATION

A number of devices can make use of small "micro" lenses, including lenses having a diameter and/or largest dimension less than about 5 mm, preferably less than about 1 mm, and more preferably about 800 micrometers or less. Although embodiments of the present invention can be used in connection with many different devices or applications, micro lenses are believed especially useful in connection with certain optical storage and/or read/write devices such as compact disks (CDs) and/or digital versatile disks (DVDs) and read or write apparatus used in connection with CDs or DVDs. Small lenses are especially useful in connection with small form-factor and/or low weight devices including those described in U.S. patent applications Ser. Nos. 09/315,398; 09/652,975; and 09/457,104, incorporated herein by reference.

Despite the fact that (as described below) the small size of such lenses may present opportunities for reducing the cost and/or increasing the quality of lenses, many approaches to fabricating small lenses have used technology substantially similar to those used in connection with relatively larger lenses. Accordingly, it would be useful to provide small lenses, and system methods and apparatus for manufacture, which can exploit at least some of the opportunities which are available as a result of the small size of micro lenses.

At least some lens making approaches have failed to provide relatively large numbers of lenses per process step and, indeed, many previous approaches provide only a single lens at a time, (i.e., such that a process step is applied to only a single lens or lens blank and/or apparatus such as a molding or grinding device is applied to only a single lens or a lens blank at any one time). Accordingly, it would be useful to provide a system, method and apparatus which makes it economical and feasible to provide high quality micro lenses which are formed many-at-once, such as forming or processing at least about 1000 lenses at once, preferably at least about 3000 lenses at once.

One of the disadvantageous aspects of some older lens fabrication approaches is the relatively slow cycle time, which is exacerbated when lenses are fabricated, e.g., one at a time. For example, some previous lens fabrication approaches involve a molding process. A typical cycle time for glass lens molding is around 60 to 90 seconds (or more) per cycle. When lenses are formed (in any given molding apparatus) one-at-a-time, this, of course means that a process time of 60 to 90 seconds or more is required per lens even when a continuous or "production line" process is used. Accordingly, it would be useful to provide a system, method and apparatus for fabricating micro lenses which can achieve a per-lens (effective) cycle time substantially less than about 60 seconds.

Another potential disadvantage associated with molding of glass lenses is that molding typically uses relatively low-temperature glass. Accordingly, some lens molding approaches are restricted in the lens materials that can be used. These material restrictions can, accordingly, place limitations on performance parameters such as index of refraction, dispersion and/or can affect lens cost. Accordingly, it would be useful to provide a system, method and apparatus which can achieve effective and economic micro lens production without being restricted to low temperature glass.

In at least some lens mnolding approaches, molding is achieved by compressing heated glass between the two opposed, typically concave, end surfaces of movable "pins". Such approaches can lead to variances (with respect to nominal shapes or dimensions), e.g. in the lens thickness and/or alignment of lens surfaces owing to such factors as lateral or angular misalignment of pins or axial mispositioning (e.g., as the pins are moved towards one another) and/or end surface wear, scratching and the like. Accordingly, it would be useful to provide a system, method and apparatus which can avoid at least some of the lens thickness variability or other variabilities in the fabrication of micro lenses.

In many previous approaches, following fabrication, lenses were coupled to separate devices such as mounting rings and the like. This typically involves providing additional gluing (or other coupling) steps, contributing to overall fabrication costs. Accordingly, it would be useful to provide a system, method and apparatus which can provide desired functions, such as providing mounting surfaces, optical or other stops and the like, while reducing the number of components and/or the steps or procedures for gluing or otherwise coupling components.

Another advantageous feature of etched lenses is a consequence of the fact that if photolithography is already used to define the shape of the lens, this process may be modified to allow inclusion of features such as diffractive surfaces or sub-wavelength features. Diffractive surfaces facilitate the use of a wider range of materials, since chromatic aberrations may be at least partially eliminated using a diffractive surface.

SUMMARY OF THE INVENTION

The present invention includes a recognition of the existence, source and/or nature of problems in previous approaches, including as described herein.

In one aspect, the present invention provides a feasible system for fabricating multiple micro lenses at substantially the same time. In one approach, wafer-scale technology is used, such as by fabricating multiple micro lenses, substantially all at the same time, on a single wafer (e.g., with a diameter greater than about 3 inches, about 7.5 cm) and cutting the wafer, or otherwise separating the individual lenses from one another. In one embodiment, lens surface formation includes etching, such as etching to a depth greater than about 100 micrometers. Preferably, etching methods and materials are employed which can achieve etching to a depth of greater than about 100 micrometers in less than about 10 hours. In one embodiment, the wafer is formed of, or includes, zinc selenide (ZnSe), gallium phosphide and/or fused silica, which can be etched, preferably by a reactive ion etch, using a gray-scale mask or multiple binary level masks to form the desired lens size and shape. In one embodiment, the lenses having a diameter of about 800 micrometers and a sag height of about 200 micrometers are formed using an etch process which lasts less than about 10 hours.

It is believed that at least some previous approaches have used molding techniques in preference to, e.g., etching techniques, because of a belief that molding techniques can achieve better control over lens shape particularly at large sag depths. However, even if it is assumed that etching techniques provide less control over lens surface shapes, etching techniques are especially useful in providing high accuracy in items such as lens thickness, lens diameter alignment or desired parallelism of lens surfaces and the like.

In one aspect, the potential of etching techniques, in a context of micro lens formation, is exploited to form a structure which includes both desired lens surfaces and other structures such as a mounting ring, a crash stop and/or an optical stop (aperture stop). By forming a structure which is an integrated or unitary structure including both lens surfaces and mounting ring or crash stop, it is possible to reduce the number of fabrication steps needed (such as by eliminating a gluing or other coupling step) and to reduce costs associated with designing, fabricating, ordering, stocking, inventorying, multiple separate parts and the like, e.g. in producing a read/write device (FIG. 6) or similar apparatus.

In one aspect, one or more diffractive optics are formed on or adjacent one or both lens surfaces which, at least in the context of micro lenses, can effectively perform functions such as correcting aberrations due to dispersion, sub-wavelength features can also be formed on surfaces which have refractive indices intermediate between the lens and air allowing antireflection layers to be formed (as opposed to the conventional additional step of coating application by evaporation or sputtering). Suitable patterning can also form anisotropic layers, which may be birefringent and allow other system components such as quarter wave plates to be formed by etching preferably in a single step. Preferably, the lenses are relatively high-index of refraction lenses, such as having an index of refraction of at least about 1.4, preferably at least about 2 and even more preferably about 2.5 or more. Preferably, the lenses are substantially transparent in desired wavelength ranges such as wavelengths in the red region of the optical spectrum or other wavelengths associated with laser diodes or other light sources. High refractive index lenses are preferable because they require smaller etch depths and can therefore be quicker and cheaper to fabricate. However, high RI lenses typically have high dispersion and require compensating optics (e.g. diffractive optics) to minimize chromatic aberrations. The proposed process facilitates rapid fabrication of high index dispersion-corrected lenses.

In one aspect, micro lenses are fabricated using processes which opera on multiple lenses at a time. In one embodiment, wafer-scale processing includes employing photolithography for defining gray-scale masks which permit relatively smooth or continuous curvatures of lens surfaces to be formed by, e.g., reactive ion etching. Processes and materials are used which achieve desired etching at a sufficiently rapid rate such as etching to a depth of about 200 micrometers in less than about 10 hours. Wafer-scale molding processes can also be used. Features can be formed on or adjacent lens surfaces to provide functions such as dispersion correction. Also, sub-wavelength scale features may be etched to provide quarter-wave plate functionality, birefringence, anti-reflective functions and the like. Structures such as mounting rings and/or crash stops can be formed integrally with the lens body, eliminating the need to glue or otherwise couple separate components.

DETAILED DESCRIPTION OF THE PREFERRED EMBODIMENTS

Figure 1:
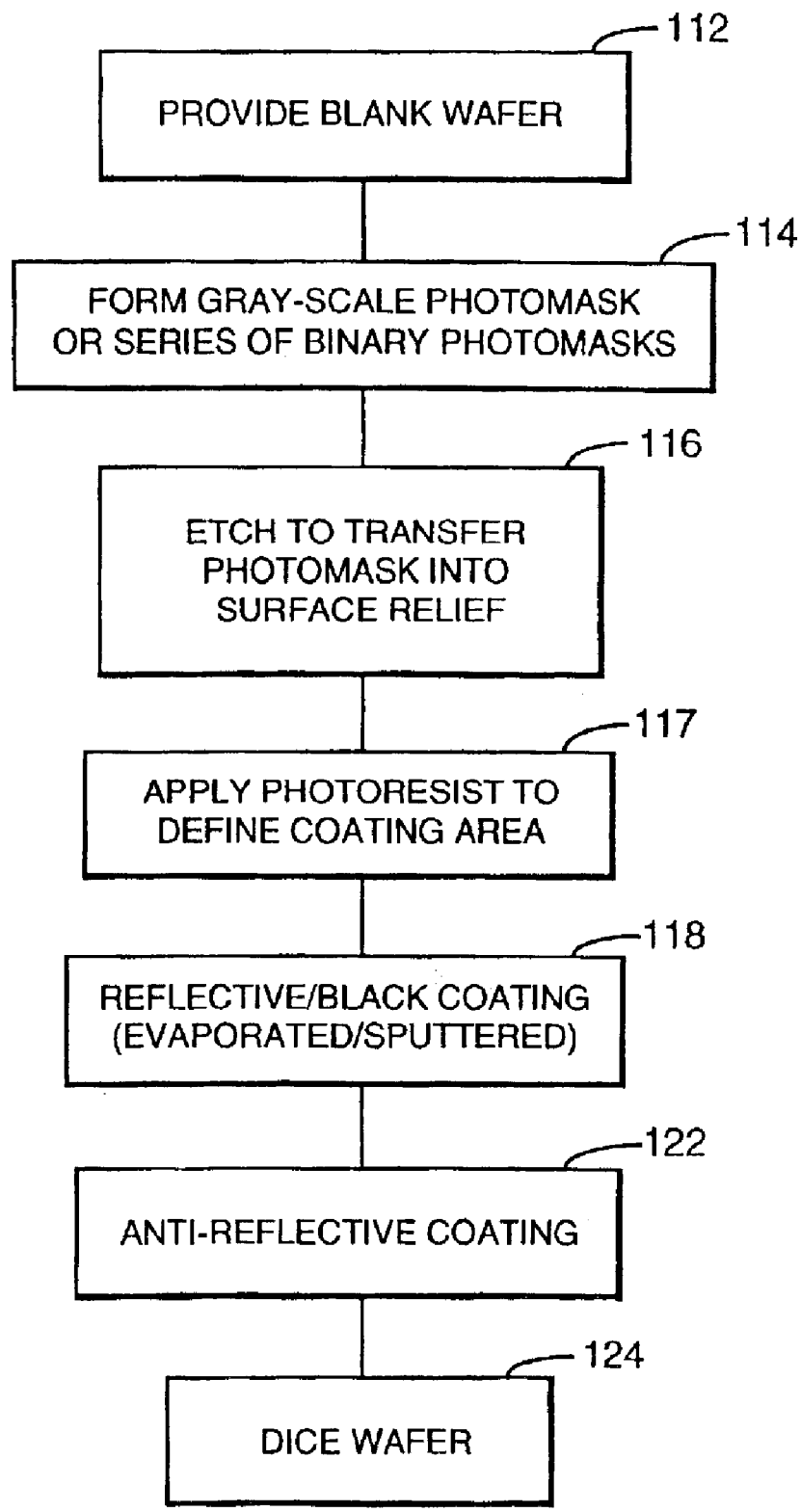
FIG. 1 is a flow chart including steps in a lens-forming process according to an embodiment of the present invention.
Figure 2:
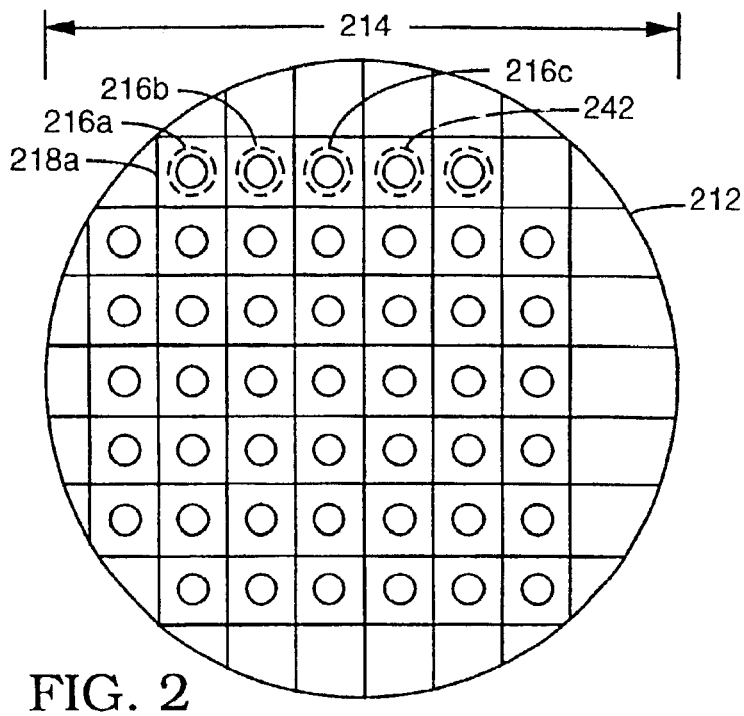
FIG. 2 is a top plan view of a wafer in one stage of processing according to an embodiment of the present invention.

As depicted in FIG. 1, in one embodiment of the present invention, micro lenses are formed by a wafer-scale etching process. In this process, a blank wafer is provided 112. Although a variety of sizes and shapes can be used, the wafer 212 (FIG. 2, not to scale) is preferably of a type similar in size and shape to wafers used in other processes such as micro electronic component ("chip") fabrication processes. In one embodiment, the wafer 212 has a diameter 214 of about 5 inches (about 15 cm). The wafer is used for forming (as described below) a plurality of lenses 216a substantially all at the same time, with the areas of the wafer containing the lenses 216a being separated from one another, e.g., by sawing along "dicing" lines 218a. In one embodiment, the wafer has a thickness 215 less than about 1 mm, preferably less than 500 micrometers. Although the present invention can be used in connection with a variety of lens sizes, in one embodiment, the diameter of the lens surfaces 312 (FIG. 3) is less than about 1 mm, preferably about 800 micrometers.

The wafer 212 can be formed of a number of materials. Preferably, the material is substantially transparent at least in a first desired wavelength band such as being transparent in the wavelength region of about 630–670 nanometers. Preferably, the wafer has a sufficiently high index of refraction such as an index of refraction greater than about 1.4, preferably greater than about 2, and more preferably about 2.5 or more. Examples of materials that can be used according to embodiments of the present invention include fused silica, zinc selenide and gallium phosphide. Zinc selenide is particularly useful because it not only provides desired transparency and has a relatively high refractive index (about 2.5) (allowing use of relatively shallow lens curvatures) but also can be etched relatively rapidly such as up to ten times (or more) faster than more traditional lens materials (such as fused silica) by present techniques. For example, in one embodiment, etching, according to embodiments of the present invention, can provide 800-micron diameter lenses with a sag height 213 (difference in height between highest and lowest points on a lens surface) of about 200 micrometers using an etching process which requires about 10 hours or less. Using at least some previous processes and materials, etching for 10 hours could achieve a sag height of only about 20 micrometers.

Alternative etching approaches include using multiple masks (e.g. a series of binary photomasks) and etch steps to approximate a lens surface forming a stair-step profile. Although it is possible to use these approaches in some embodiments of the present invention, in one embodiment it is preferred to form a gray-scale mask (a mask having preferably gradual or continuous changes in the degree of "transparency", i.e., transparency to the etching process, from point to point or region to region of the mask). Those of skill in the art will understand how to form and use a gray-scale mask at least after understanding the present disclosure. In one process, the surface to be masked is coated with a photoresist material which is selectably exposed to light (and, in some embodiments cured). Removal of uncured or unexposed photoresist leaves the desired mask pattern.

Figure 3:
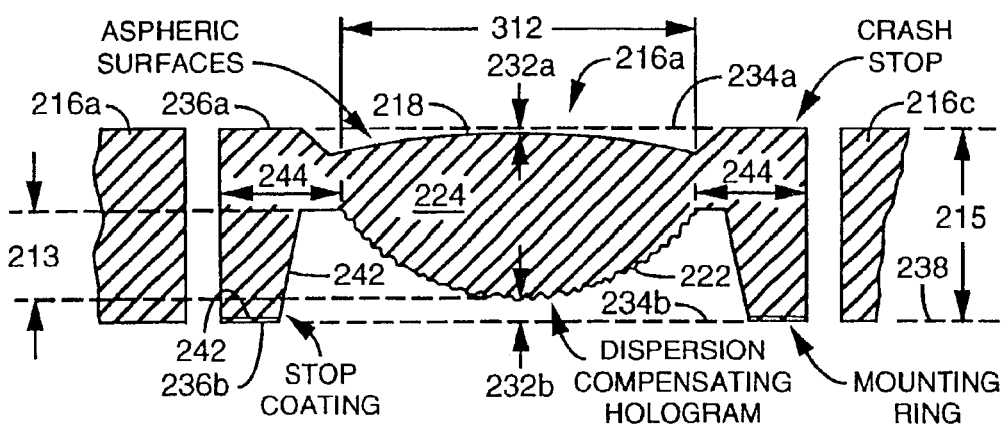
FIG. 3 is a cross-sectional view through a micro lens according to an embodiment of the present invention.

Following masking 114, the lens surface is etched. Although, as will be understood by those of skill in the art, a variety of etching processes can be used, preferably, a reactive ion etch process is used 116:

In the embodiment depicted in FIG. 3, etching is used to define both upper surface 218 and lower surface 222 of the lens 224. The desired size, shape and curvature of the lens surfaces will be determined by the particular lens application. Embodiments of the present invention can be used to form one or both lens surfaces 218, 222 as aspheric, spherical or piano surfaces.

In the depicted embodiment, the lower surface 222 is further provided with a hologram diffractive optic). The hologram, if provided, can be on one or both surfaces 222, 218 or can be positioned on or near an edge of the lens surfaces. Typically, a hologram will have very small relief depth such as one to two micrometers. In general, diffractive optics can be used to achieve a variety of functions.

Figure 6:
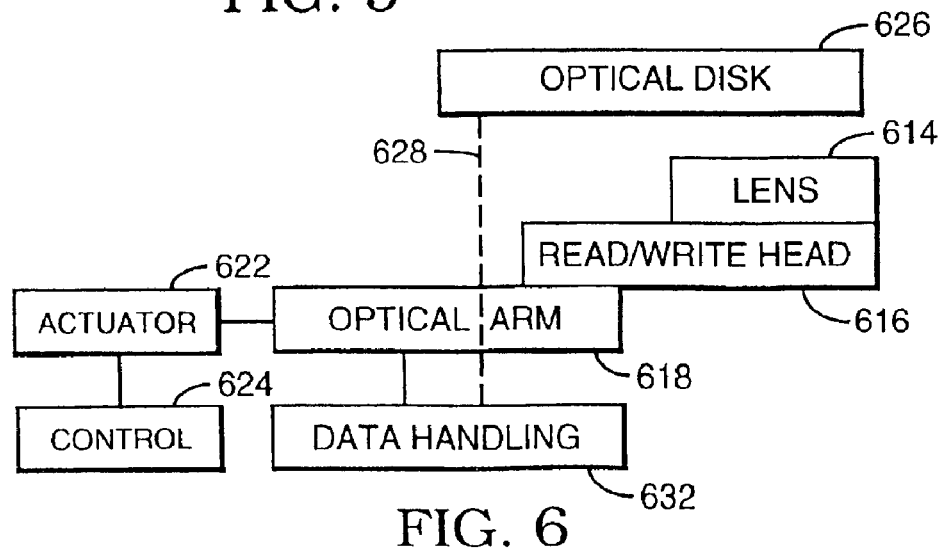
FIG. 6 is a block diagram of a read/write device having a lens, according to an embodiment of the present invention.

Diffractive optics on surfaces of lenses can be used for a variety of functions including dispersion compensation, beamsplitting, apodization. In one embodiment, provision of dispersion compensation is particularly advantageous in the context of high refractive index materials (such as zinc selenide) which typically also have relatively high dispersion (wherein the index of refraction changes rapidly with changes in wavelength) although some amount of dispersion (or wavelength) correction can be achieved by a servo system, it can be difficult for a servo system to react sufficiently rapidly to correct for large changes in wavelength (such as those that might result when switching between a read mode and a write mode). Accordingly, provision of a hologram dispersion correction, even though it may reduce efficiency of a lens somewhat, can be useful in the context of the read/write optical disk and/or apparatus, e.g., as described in Ser. No. 09/315,398, supra. As seen in FIG. 6, in a read/write device 612, a lens 614 can be directly mounted on a read/write head 616, positioned by an optical arm 618, by an actuator 622 controlled by a central circuit 624. The lens provides or receives light to or from optical media 626 such as a disk rotatable about an axis 628, the optical signal being provided by or to data handling circuitry 632.

Figure 4:
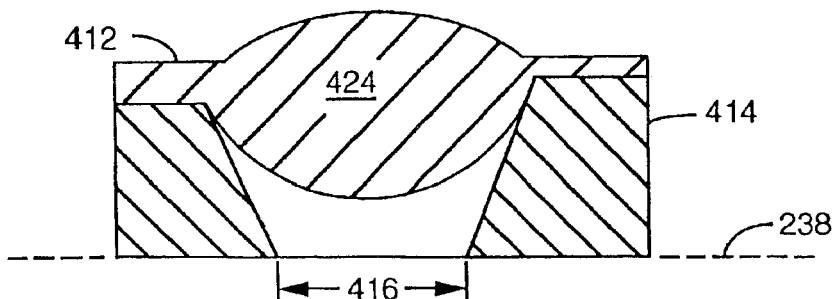
FIG. 4 is a cross-sectional view through a lens and mounting ring.

In the embodiment of FIG. 3, the surfaces of the lenses are vertically offset 232*a,b* from the surfaces or planes 234*a,b* defined by the upper and lower surfaces of the wafer, to define upper and lower 236*a,b* regions substantially surrounding the lens surfaces. In one embodiment, the, e.g., lower surrounding region 236*b* can act as (or take the place of) a mounting ring, i.e., a structure for mounting and positioning the lens 224*a* desired distance with respect to a mounting surface 238. As depicted in FIG. 4, in previous approaches, regions integral with and surrounding a lens 424, 412 (if any) were positioned so as not to extend beyond the upper or lower surfaces of the lens 424. Accordingly, in previous approaches, a separate mounting ring 414 was coupled to the surrounding regions 412. This required that a separate piece 414 be designed, stocked, inventoried and, during fabrication, coupled to the lens 424, e.g., by (typically ultraviolet-curable) glue. The embodiment depicted in FIG. 3 makes it possible to eliminate the need to provide a separate lens mount 414, because the regions 236*b*, providing a lens mount function, are formed as a unitary and integral piece with the lens 224 and, indeed, are part of the original wafer 212. All of the lenses in the wafer 212 are provided with mounting rings at substantially the same time. Embodiments of the present invention make it possible to avoid the need for providing, stocking, inventorying, maintaining and coupling separate mounting rings 414.

In the embodiment depicted in FIG. 3, the upper surface 236*a* surrounding the lens 224 acts as a crash stop, i.e., such that if the device on which the lens is mounted (such as a read/write head, e.g., as described in Ser. No. 09/457,104) is brought too close to an adjacent object (such as an optical disk or other media), any physical contact will be between the surrounding area 236*a* and the adjacent object, while the lens 224 will remain protected by the spacing 232*a*. As shown in FIG. 3, preferably the crash stop region 236*a* is formed as an integral and unitary piece with the lens 224. Accordingly, in the embodiment of FIG. 3, the crash stop region 236*a* is provided without the need for designing, stocking, storing or attaching a separate crash stop ring or the like.

In some embodiments, it is desirable to carefully control the size and/or shape of the beam which enters or exits the lens, e.g., in order to closely control the "spot size" in an optical media read/write device. In some previous approaches, a separate optical stop or aperture stop was provided. In the previous approach illustrated in FIG. 4, the lower surface of the mounting ring 414 was substantially opaque and thus defined an aperture 416. In the embodiment of FIG. 3, the function of an aperture stop is provided by applying a reflective and/or opaque coating 242 to an annular region 244 surrounding the lens 224. In the embodiment depicted in FIG. 3, the coating 242 is applied to the lower surface. Preferably, the coating 242 is applied using a mask 117 (preferably defining aperture stops for all lenses on the wafer 212 substantially simultaneously) in a lithographically defined manner. Those of skill in the art will understand how to use a separate mask to provide coatings on selected regions of the wafer 212. A number of materials can be used for coating including metals (such as chromium, aluminum, germanium or compounds or alloys thereof) or, in general, any the opaque material. The coating can be applied by any of a number of known techniques including evaporation and/or sputtering 118.

If desired, one or, preferably both, surfaces of the wafer can be coated with an anti-reflective coating 122 using techniques and materials that will be understood by those of skill in the art after understanding the present disclosure. The wafer 212 is then diced 124 by sawing or otherwise cutting along lines 218a.

In one embodiment, the lens 224 is mounted directly (i.e., without the need for a separate mounting ring) on a mounting surface 238, e.g., by uv-curable gluing. In one embodiment, the mounting surface 238 may consist of or include another optical element such as a quarter-wave plate. In embodiments in which quarter-wave plate functionality is provided, e.g., by a hologram formed on or near a lens surface (as described above), the lens may be mounted directly on a (non-optically-active) surface defining a portion of an optical path.

Figure 5:
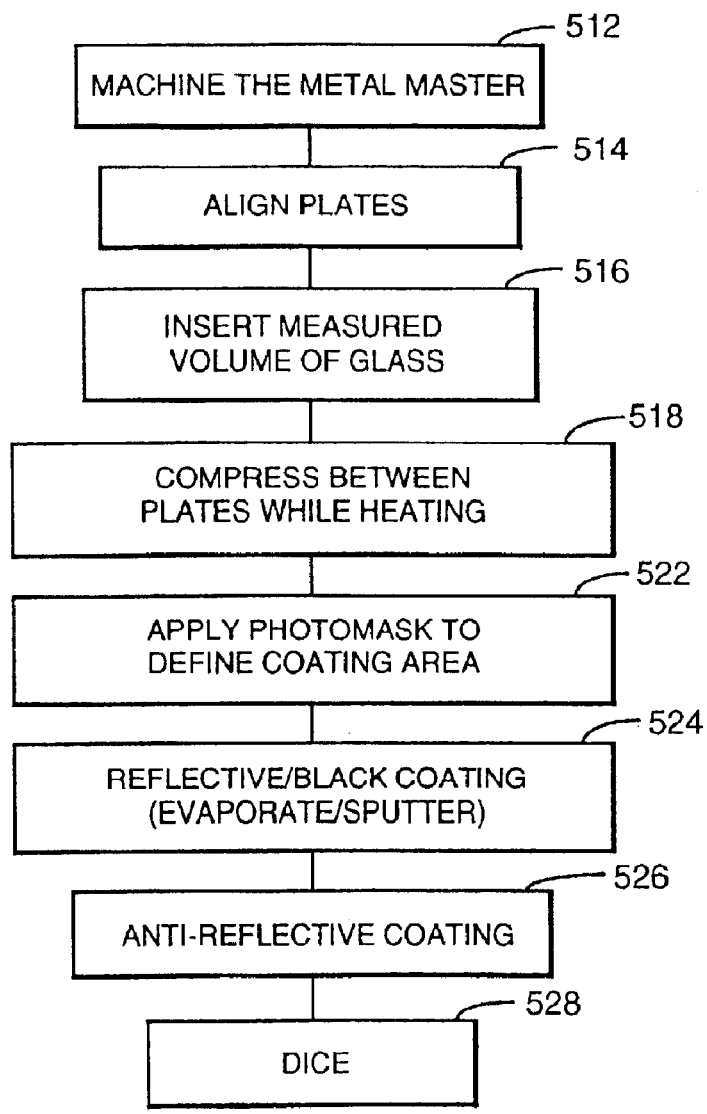
FIG. 5 is a flow chart including steps in a lens-forming process according to an embodiment of the present invention.

Although there are numerous advantages to forming micro lenses by an etching process, it is also possible to use some or all features of the present invention while forming the lens by other processes such as molding (FIG. 5). In the procedure of FIG. 5, the master mold plate is machined or otherwise formed 512 to define a plurality of concavities or similar shapes for forming lens surfaces. Upper and lower plates are aligned, e.g., within a press 514 and a measured volume or shape of glass (or plastic or other lens material) is inserted between the plates 516. The lens material is compressed between the plates 518. In some embodiments, heating may be applied during the compression such as using resistance heating, induction heating, convection or other air or gas heating, microwave heating, ultrasound and the like. After the wafer is molded to (simultaneously) define the lens surfaces (which may, if desired, be surfaces shaped similarly to that depicted in FIG. 3) other steps, similar to those defined above in connection with an etching process, can be used, such as applying one or more photomasks to define coating areas 522, applying reflective or other coatings such as by evaporation or sputtering 594, applying one or more anti-reflective coatings 526 and separating the wafer into individual dies 528.

In light of the above description, a number of advantages of the present invention can be seen. The present invention makes it feasible to provide micro lenses by fabrication steps which operate on multiple lenses at a time, e.g., using wafer-scale processes, rather than one-lens-at-a-time processes. Embodiments of the present invention can be used to form components integrally with the lens body (rather than coupling separately-formed components as was typically done in previous approaches), including diffractive optics, coatings, birefringent layers, crash steps, and optical apertures. The present invention can make it feasible to apply reflective or other coatings in desired patterns (e.g. to define an aperture stop for a lens) for multiple lenses at a time (e.g., all lenses on a wafer). Embodiments of the present invention can achieve etching at a relatively rapid pace such as etching to a depth of about 200 micrometers and less than about 10 hours. The present invention makes it feasible to mass-produce micro lenses using high refractive index materials. In some embodiments of the present invention, diffractive optics provided on or adjacent lens surfaces can provide any or all of a number of functions including dispersion correction. Also structures to provide the functions of quarter-wave plate functions, birefringence, or anti-reflective properties can be provided.

A number of variations and modifications of the invention can be used. It is possible to use some features of the invention without using others. For example, it is possible to use wafer-scale fabrication for micro lenses without providing wafer-scale anti-reflection coatings. Although embodiments have been described involving etching (FIG. 1) or molding (FIG. 5), it is also possible to use other to use some or all features of the present invention in a context of other lens formation processes such as grinding and the like, or combinations of processes, such as rough molding followed by fine etching. Although the present invention has been described in the context of double convex lenses, it is also possible to use some or all features of the present invention to fabricate concave lens and surfaces, or other optical shapes such as gratings, holograms and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A microlens assembly comprising:
   first and second opposed lens surfaces etched from portions of opposed surfaces of a substrate to provide a first microlens;
   a structure adjacent at least a portion of the perimeter of said first or second lens surfaces, said structure being at least one of:
   a lens mount; or
   a crash stop;
   wherein said microlens and said adjacent structure are formed as a single, unitary substantially monolithic piece of the substrate, without the need to couple two or more separately-formed structures to provide said piece.

2. An assembly as claimed in claim 1 wherein said adjacent structure includes a part of a surface of said substrate.

3. An assembly as claimed in claim 1 wherein said adjacent structure includes a structure etched from a part of a surface of said substrate.

4. An assembly as claimed in claim 1 wherein said substrate includes a material selected from the group consisting of ZnSe, gallium phosphide or fused silica.

5. An assembly as claimed in claim 1 wherein said microlens is etched by a reactive ion etch.

6. An assembly as claimed in claim 1 further comprising a reflective or opaque coating selectively positioned on at least portions of a surface of said assembly.

7. An assembly as claimed in claim 1 further comprising a diffractive optic pattern positioned on said assembly.

8. An assembly as claimed in claim 7 wherein said diffractive optic is a hologram.

9. An assembly as claimed in claim 7 wherein said diffractive optic is configured to provide dispersion compensation.

10. An assembly as claimed in claim 1 further comprising positioned means for providing at least one of a quarter wave plate functionality, birefringence, or anti-reflective functionality.

11. An assembly as claimed in claim 1 wherein said microlens is configured for use with at least one wavelength of light and wherein said positioned means comprise sub-wavelength features in a plurality of regions of said wafer.

12. An assembly as claimed in claim 1 wherein surfaces of said lens surfaces are positioned recessed from an adjacent surface region of said substrate.

13. An assembly as claimed in claim 1 wherein said microlens has an index of refraction of at least about 1.4.

* * * * *